United States Patent [19]

Seefluth

[11] Patent Number: 4,711,609
[45] Date of Patent: Dec. 8, 1987

[54] DRILL TOOL

[75] Inventor: U. Christian Seefluth, Hamburg, Fed. Rep. of Germany

[73] Assignee: Sita Baulemente GmbH, Pinneberg, Fed. Rep. of Germany

[21] Appl. No.: 509,049

[22] Filed: Jun. 29, 1983

[30] Foreign Application Priority Data

Jun. 29, 1982 [DE] Fed. Rep. of Germany ....... 3224141
Jul. 8, 1982 [DE] Fed. Rep. of Germany ....... 3225519
Oct. 12, 1982 [DE] Fed. Rep. of Germany ....... 3237721

[51] Int. Cl.⁴ ............................................. B23Q 11/00
[52] U.S. Cl. ..................................... 408/68; 175/213; 408/17
[58] Field of Search ................... 408/205, 206, 58, 68, 408/239, 239 A, 240, 17, 67; 175/213, 209; 76/108 R, 108 A; 279/19, 19.4, 19.5, 19.7

[56] References Cited

U.S. PATENT DOCUMENTS 3,144,912 8/1964 Boehm et al. ...................... 175/213
3,456,743 7/1969 Badcock ............................. 173/170
3,547,206 12/1970 Phillips ............................. 173/57 X
4,036,308 7/1977 Dallenberg ........................ 175/213 X
4,097,176 6/1978 Wanner et al. .................... 408/68 X

FOREIGN PATENT DOCUMENTS 479486 1/1932 Fed. Rep. of Germany ........ 173/57
2142927 3/1973 Fed. Rep. of Germany ........ 173/57
3003698 8/1981 Fed. Rep. of Germany ........ 408/56

Primary Examiner—Z. R. Bilinsky
Attorney, Agent, or Firm—Antonelli, Terry & Wands

[57] ABSTRACT

A drilling tool for one of stationary and mobile use as, for example, a hand tool, and especially a motor powered tool capable of rotary drilling, percussion drilling, or hammer drilling for drilling into concrete, rock, or the like materials and/or in metals of various types. The drilling tool includes a drill head on a shank encompassing at least a bit shank and has a recess extending through the drill head coaxially to a longitudinal axis of the bit shank, which recess is adapted to receive a drilled core. The recess is constructed as a central bore and is provided at an end facing away from the drill head with an outlet or discharge orifice for the drilled core material collected in the recess. The outlet or discharge orifice of the recess in arranged in the shank zone provided outside of the drill head. The drilling tool may be provided with external helical or spherical drilling portions, with the outlet or discharge orifice being arranged at a position spaced from the external helical or spiral drilling portions.

4 Claims, 15 Drawing Figures

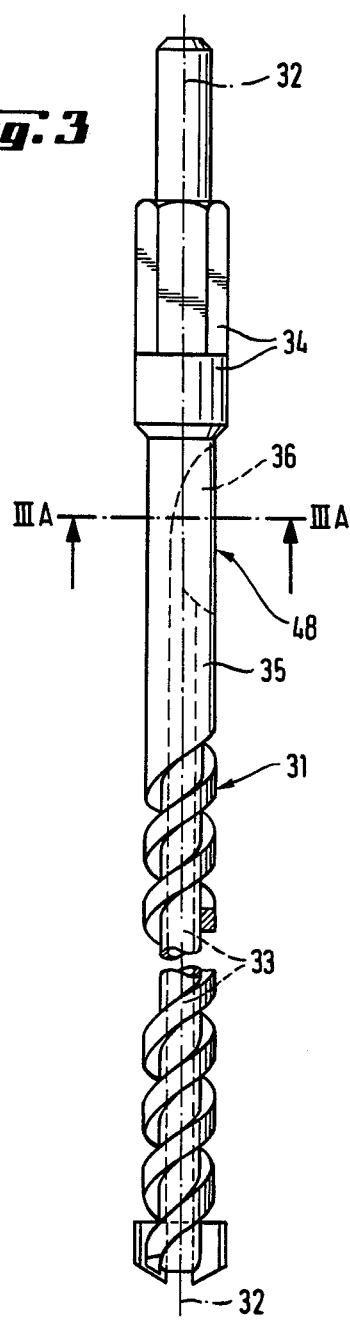
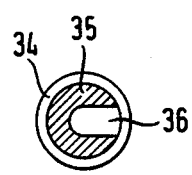
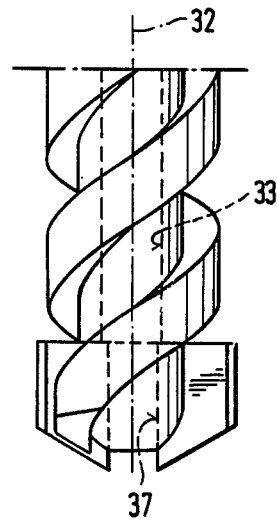

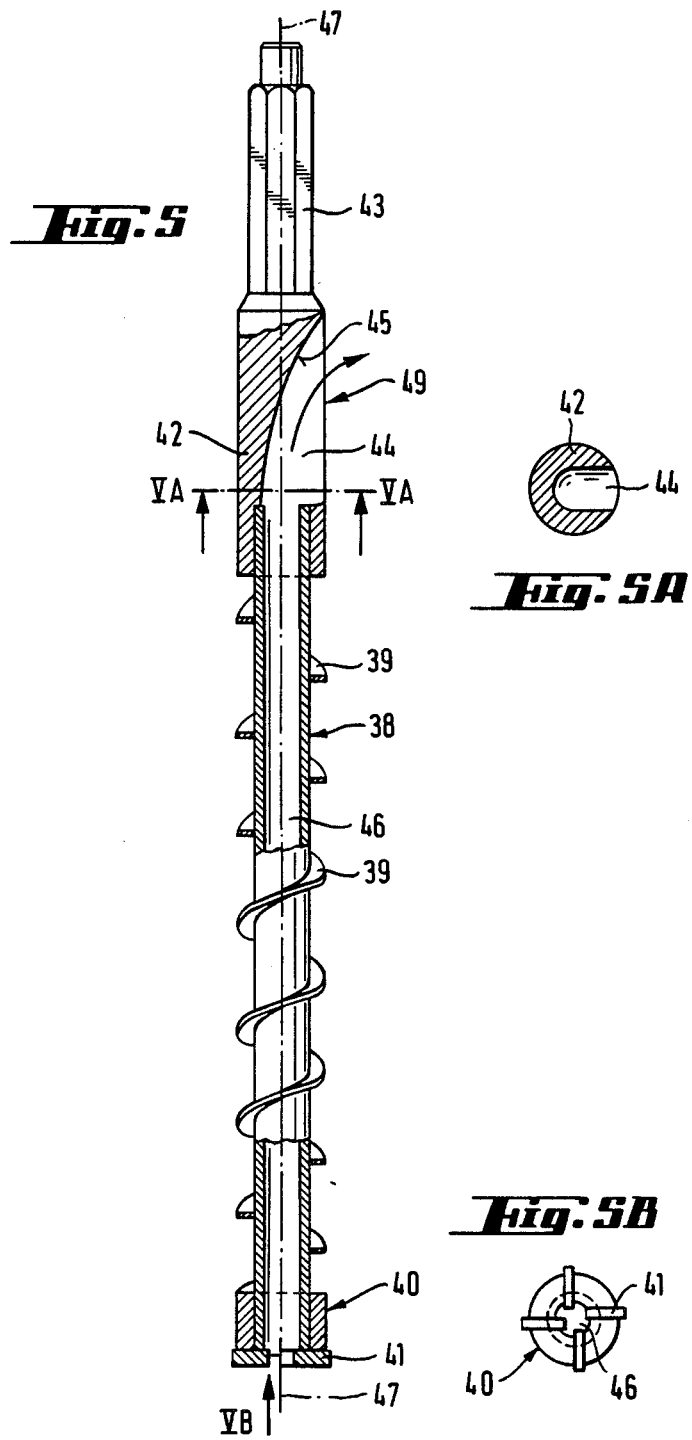

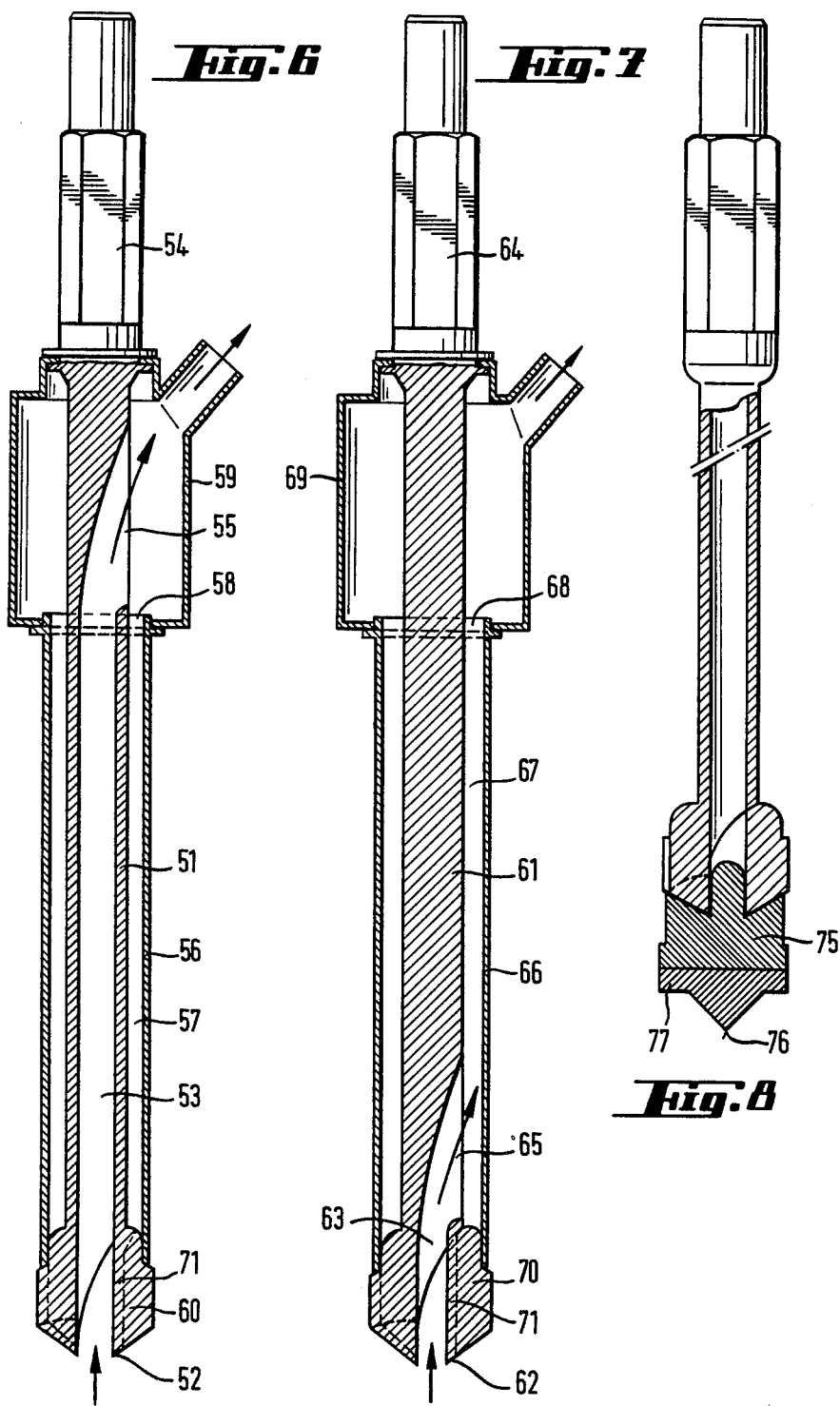

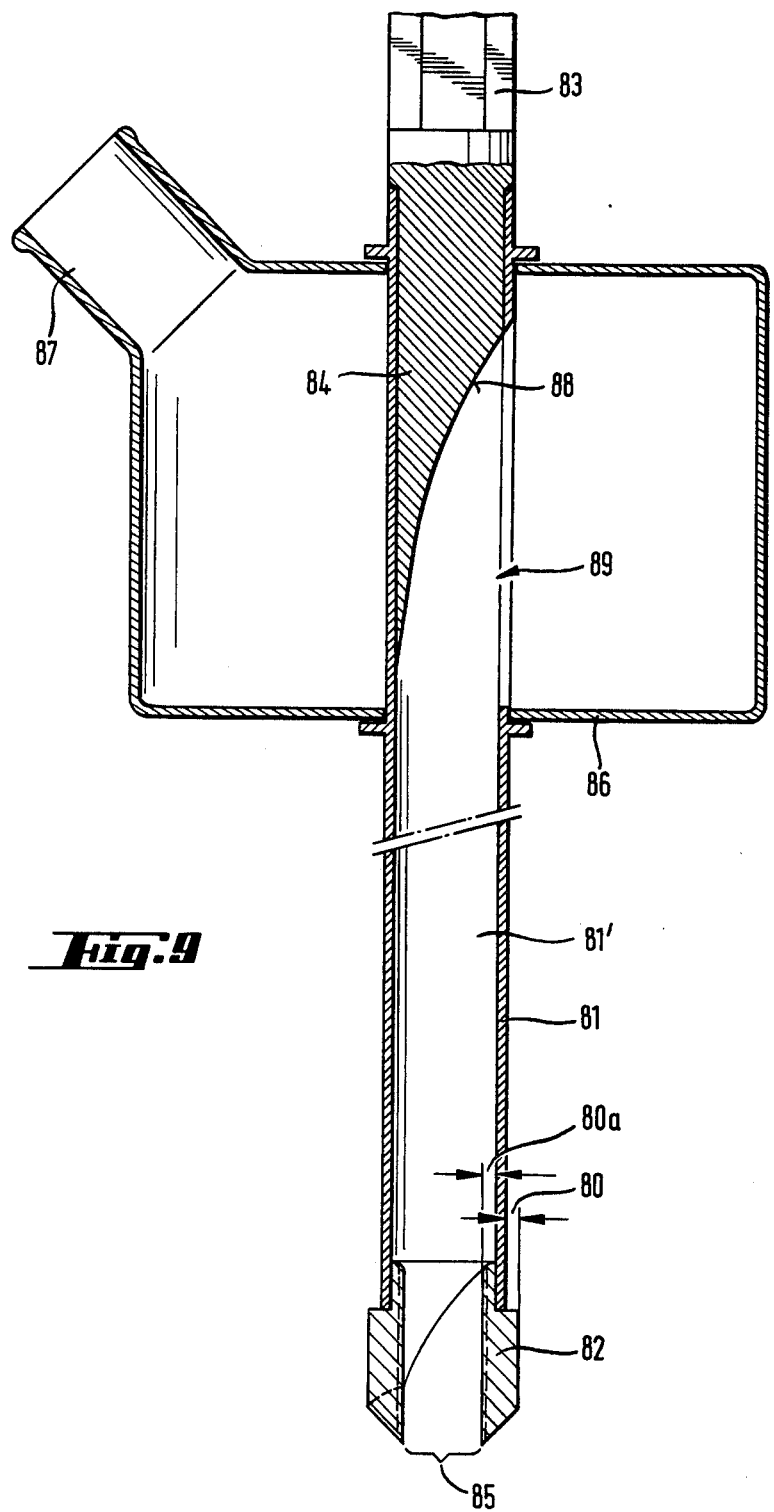

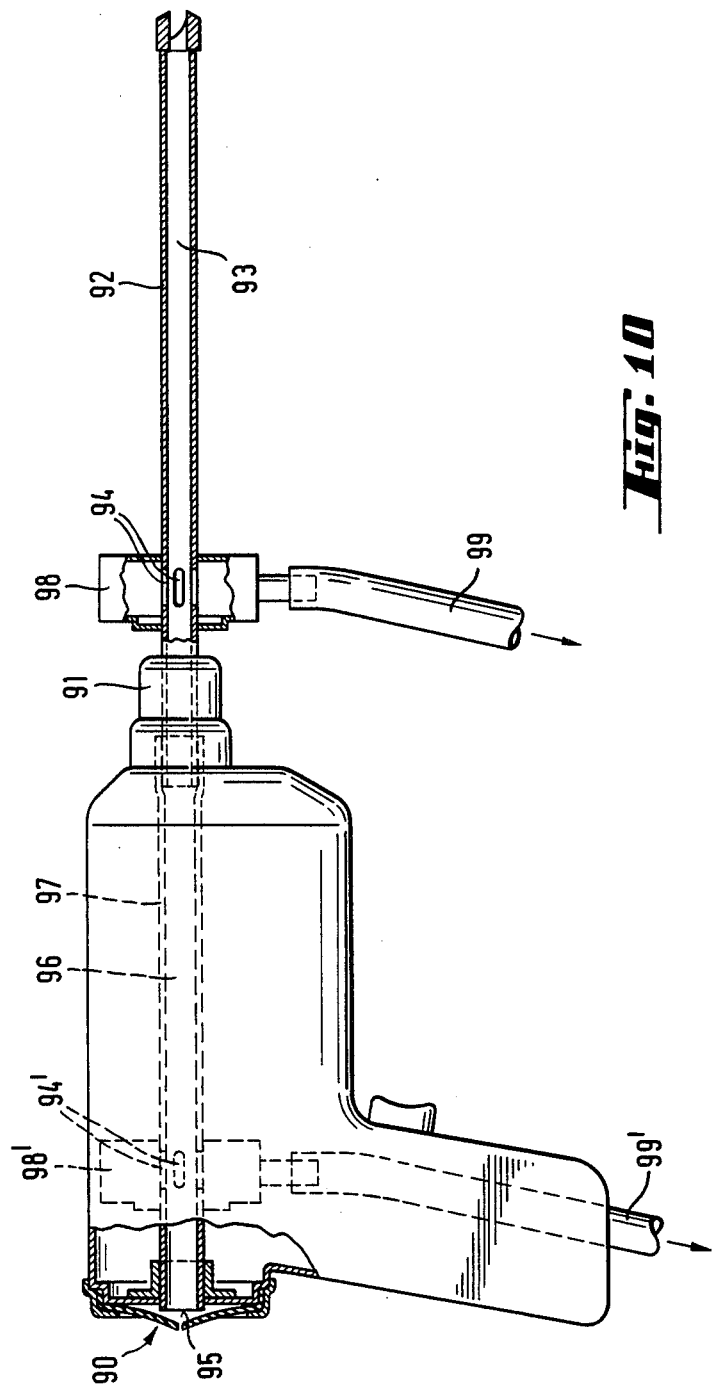

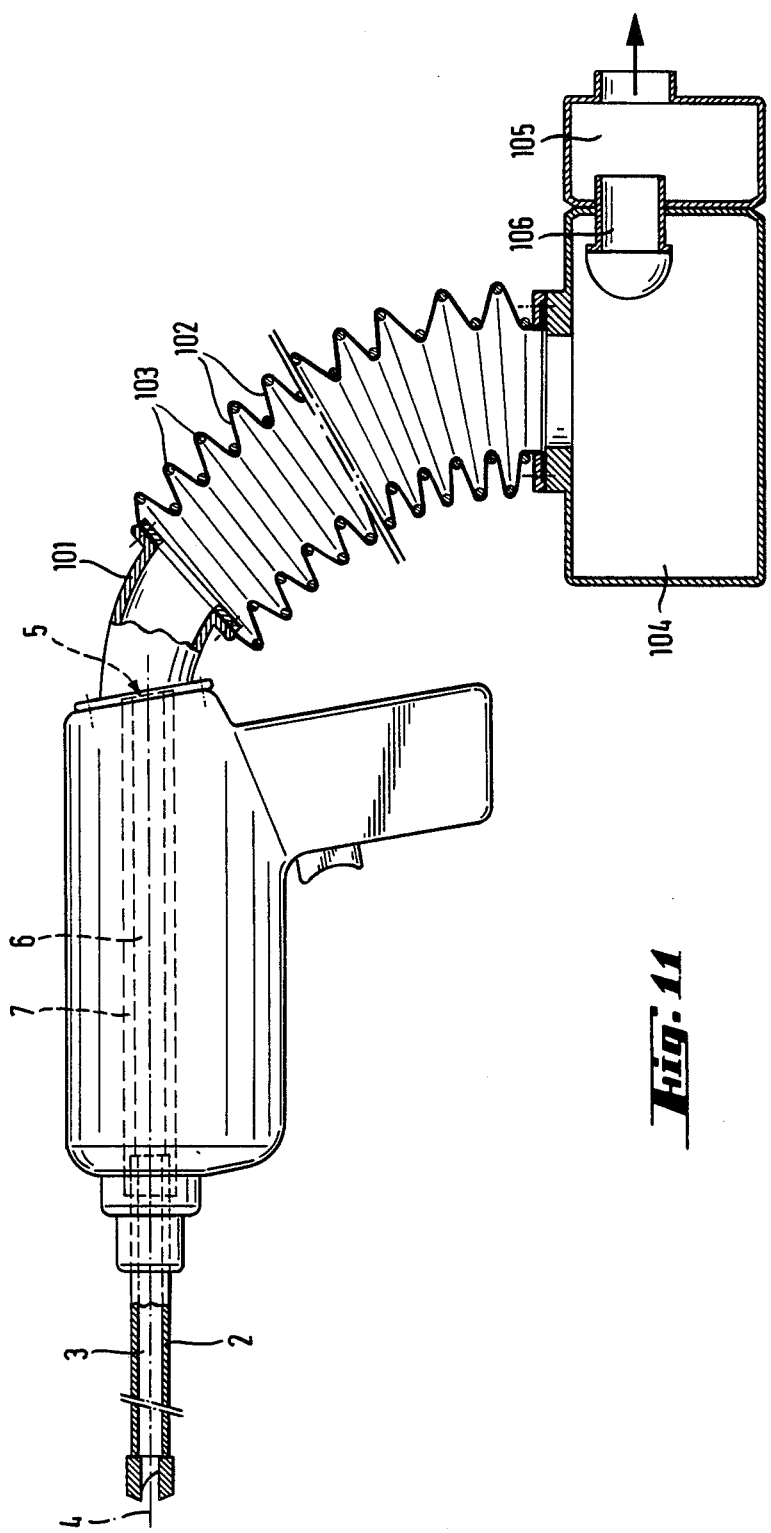

DRILL TOOL

The present invention relates to a drill means for fixed and mobile use, as a hand tool, and, more particularly, to a motor powered tool means such as, for example, a rotary drilling tool, percussion drilling tool, or hammer drilling tool for drilling in concrete, rock or the like materials and/or in metals of various types, with the tool means including a drill heat on a shank encompassing at least a bit shank and recess means in the form of a central bore extending through the drill head coaxially to the longitudinal axis of the shank for receiving a drilled core, which recess means is provided, at an end facing away from the drill head, with an outlet or discharge orifice for the drill core material that has been collected.

An advantage of a trepan or core drilling tool of the aforementioned type for rotary percussion or hammer drilling in rock drilling operations resides in the fact that, in use, a substantially greater drill advance is obtained since the remaining core piece need not be crushed.

In, for example, Offenlgungsschrift No. 2,910,299, a drilling tool is proposed wherein a blind bore is provided for receiving the core material. A disadvantage of this proposed construction resides in the fact that the remaining drill core, not crushed by the drilling tool, must be removed from the recess of the drill.

In, for example, Offenlegungsschrift No. 2,808,885, another drilling tool is proposed wherein the drilled core is laterally removed immediately behind the drill head into the grooves of a spiral drill shank. This proposed construction has proven to be unsuitable because the irregularly breaking-up drilled core material adheres to or jams at various places in the drill and, especially, in an area of the spiral helices.

When drilling with an exhaust waste arrangement for removing drilling waste, the drilling tools, predominantly constructed as deep-hole drills, are fashioned as smooth tubes with a central bore for drill chip removal, and with the smooth tubes being provided with drill heads attached thereto. Various types of rock drilling tools with drilling chip or waste removal have been proposed, with the various proposals differing essentially by a varying of the construction of the cutters at the drill head. However, the various proposed drilling tools are fashioned as solid drills attaining a certain increase in a drill feed by the drill chip or waste removal means. A disadvantage of these proposed arrangements such as, for example, the arrangement described in Offenlegungsschrfit No. 2,038,979, resides in the fact that the entire material to be drilled must be crushed and removed by suction.

The aim underlying the present invention essentially resides in providing a drilling tool of the aforementioned type wherein comminution of the drilled core is at least extensively avoidable, which drilling tool does not readily clog and makes it possible to remove the drilled core material and/or the drilling chips or waste by means of a suction exhaust arrangement.

In accordance with advantageous features of the present invention, an outlet or discharge orifice for the core material is provided at a recess or channel provided in the shank in a shank zone disposed outside of the drill head and outside of an optionally following external helical or spiral configuration of a drill bit shank.

By virtue of the features of the present invention, a drilling tool is provided which ensures that the drilled core material collected in the recess or channel of the shank can continuously migrate through the recess or channel and can exit or be discharged from the recess or chanel at a point facing away from the drill head. This arrangement eliminates the need for removal of the collected drilled core material in a rearward direction as is the case with proposed drill tools provided with blind-hole recesses. By arranging the outlet or discharge orifice of the recess channel at a point of the drill bit shank which is free of the spiral or helix, it is ensured that any danger of clogging or jamming, as occurs in conventional drilling tools, is eliminated. Moreover, it is also possible to reduce the power requirement for a drilling operation while at the same time enhancing the feeding spped of the drilling operation. Furthermore, the features of the present invention provide the prerequisite that the drilled core material can be removed by suction, namely, even if the material is removed out of the shank, in the case of a smooth wall design of the drill shank, shortly behind the drill head.

The drilling tool of the present invention may be fashioned as a trepan provided with an axially extending recess or channel and with a drive means accommodating the trepan. Advantageously, the recess or channel is continued into the drive means. A shank of the drilling tool includes a bit shank and a shank zone, which shank zone may include parts of a drilling machine, especially, for example, revolving parts such as a drill chuck, drive shaft, and/or flying shaft of the machine, or other functional components. The recess or channel is advantageously formed as a longitudinally extending central bore which is continued in the drive means as a central bore through the functional parts or components of the drive means. The recess or channel extending through the drive means may terminate at an outlet or discharge orifice arranged on a side of the drilling machine which faces away from the drill chuck. This arrangement is especially suitable for drill cores of a relatively large diameter which are hard to break-up.

However, it is also possible in accordance with the present invention for the outlet or discharge orifice of the recess or channel to pass over within the drilling machine at a position, for example, shortly behind the drill chuck, into a laterally directed outlet or discharge orifice of the shank zone so that the drill core material can be laterally discharged and, preferably, collected by means of a pick-up vessel or the like. This last mentioned arrangement is preferably employed in the case of drilled cores which are more easily broken up and/or in cases of small diameter drilled cores.

A special advantage realized by including the drive means in the drill core removal since practically all types of trepans with an axially continuously extending recess can be employed.

In accordance with still further features of the present invention, the recess or channel is limited to the drill shank, that is, the shank of the drilling tool consists only of the drill shank. In this case, the recess or channel, and an end facing away from the drill head, is in communication with an outlet or discharge orifice penetrating a side wall of the drill shank in a zone between the drill head and a drill mounting structure, which mounting structure is free of spiral or helical members. In this situation, all of the features of the invention are realized within the drill bit proper forming the drilling tool, which has the advantage that this drilling tool may be powered by a commercially available drive mechanism. In a drill shank having an external helical or spiral configuration, the zone wherein the outlet orifice penetrates the side wall of the drill shank lies between the mount structure of the drill and an end of the spiral or helical member facing the same. In the case of a drill shank without a spiral or helical arrangement, which then has a correspondingly smaller diameter than the drill head, the outlet or discharge orifice can be disposed somewhere in an area between the chuck mounting structure of the drill shank and the drill head and even at a short distance behind the drill head.

Preferably, in accordance with the present invention, the outlet or discharge orifice is connected to a collection vessel for enabling a collection of the drill core material, with the vessel being preferably fixedly held or fixedly mounted to the drilling machine or otherwise mounted in place.

The removal of the drilled or waste material, especially the drill core material may be facilitated in accordance with the present invention by providing a suction means connected with a suction cage, with the suction means being connected to the drill bit shank or to an outlet of the drilling machine in dependence upon the specific drilling requirements. By virtue of the provision of a suction cage, it is possible to dispense with the need for providing a special collection vessel or, alternatively, the suction cage itself may function as a collection vessel.

When a suction means is employed, preferably, the drill shank is provided with a casing forming a substantially sealed free space between the drill shank and the casing for enabling a suction removal of drill dust or waste. Advantageously, the sealed free space is connected by open passages the suction cage as well as, preferably, by additional suction ducts extending through the drill head, to the operating zone of the drill at the drill head. In this arrangement, the drill bit shank may preferably be formed of a thin walled tube to which the drill head and drill chuck are fastened especially in a shape mating fashion by, for example, soldering, welding, or cementing. The inner drill bit shank diameter and outer drill shank diameter are dimensioned so that a vacant space for the intake air is produced between the outer wall and the bore hole wall, and a vacant space for the suction air of the drilling waste suction removal means is provided between the inner wall and the drilled core. In this manner, the recess and/or the central longitudinal bore for the core drilling is utilized simultaneously as a suction duct and the free space between the drill shank and bore hole wall is utilized as an intake air duct.

Special advantages are achieved by a construction having the last noted features of the present invention due to the fact that it is possible to provide a construction which is capable of simultaneously drilling waste suction removal and core drilling with a lateral drilled core ejection. The features obtained in this manner that the increased drilling feed, already provided by a drilling waste suction removal, is considerably improved by the core drilling. The different features of the present invention make it possible to employ conventional drilling processes with drilling waste suction removal simultaneously as trepanning, or core drilling processes. Due to the fact that the lateral drilled core ejection means of the present invention terminates in a suction zone of the drilling waste suction removal, the advantage of a "clean" drilling can be fully retained with the use of drilling waste suction removal.

For all of the constructions of the present invention operating with a lateral outlet or discharge orifice, a transition area between the recess or channel and the outlet or discharge orifice may be fashioned so as to have a shallow angled surface or an arcuate surface, especially fashioned as a slot in the shank wall, which slot can be readily produced by segemental milling. Due to the provision of the slot shaped configuration of the transistion area, widening toward the outlet or discharge orifice, the drilled core material has the possibility of being ejected without jamming, even if irregular broken up pieces of material are produced.

With a helical rock drill with two main cutters, by virtue of features of the present invention, an advantage is obtained of an essential increase in a drilling advance since the uncrushed core piece can, for example, be limited in thickness to the diameter of the cross cutter of the drill point. The core piece and/or recess in the drill bit shank could amount to up to approximately 80% of the drill bit diameter, depending upon the purpose for which the drill bit is used, in, for example, the case of square bit drills, so that only a small portion of the material to be drilled needs to be crushed.

In accordance with still further features of the present invention, the suction removal can be limited to a proportion of the drilling dust loosened especially in a peripheral zone of the drilled core material by arranging, in a zone of the suction cage mounted to the drill shank or to the shank region in an interior of the drive motor, suction slots in the shank wall through which slots the relative fine dust of the drilled core is discharged or exhausted. Coarser drilled core material passes through this zone and is laterally removed therebehind or, after passing through the machine, at an end of the machine facing away from the drill into a collecting vessel. The outlet or discharge orifice in this situation is preferably equipped with a valve means so as to make it possible for the drilled core material to exit but extensively preventing an entrance of air through the outlet or discharge orifice.

Accordingly, it is an object of the present invention to provide a drilling tool which avoids, by simple means, shortcomings and disadvantgages encountered in the prior art.

Another object of the present invention resides in providing a drilling tool which operates in a relatively clog free manner.

Yet another object of the present invention resides in providing a drilling tool which facilitates the removal of drilling waste.

A further object of the present invention resides in providing a drilling tool which is simple in construction and therefore relatively inexpensive to manufacture.

Another object of the present invention resides in providing a drilling tool which functions reliably under all operating conditions.

These and other objects, features, and advantages of the present invention will become more apparent from the following description when taken in connection with the accompanying drawings which show, for the purposes of illustration only, several embodiments in accordance with the present invention, and wherein:

FIG. 3 is a plan view of a helical rock drill bit constructed in accordance wtih the present invention provided with a central hollow channel as a recess and a core outlet or discharge orifice at an upper drill shank portion;

FIG. 3A is a cross sectional view taken along the line A-B in FIG. 3;

FIG. 4 is a plan view, on an enlarged scale, of a drill tip portion of the helical rock drill bit of FIG. 3;

FIG. 5 is a partial cross sectional plan view of another embodiment of a helical rock drill bit constructed in accordance with the present invention having a helix attached thereto and a drill head soldered thereto, and a core outlet or discharge orifice at an upper drill shank;

FIG. 5A is a cross sectional view taken along the line A-B in FIG. 5;

FIG. 5B is an end view of the drill tip of the helical rock drill of FIG. 5;

FIG. 6 is a longitudinal cross sectional view of a rock drill constructed in accordance with the present invention including a drill waste exhaust and lateral drilled core ejection;

FIG. 7 is a longitudinal cross sectional view of another rock drill constructed in accordance with the present invention with a lateral drilled core ejection disposed in proximity to a drill head;

FIG. 8 is a partially schematic longitudinal view of a drill bit for trepanning or core drilling with a tapping device attached to a tip thereof;

FIG. 9 is a partial cross sectional longitudinal schematic view of a trepan or core drill constructed in accordance with the present invention with a drill waste suction removal and lateral drilled core discharge;

FIG. 10 is a schematic longitudinal view of a drilling machine provided with a hollow drill constructed in accordance with the present invention employing a suction removal device for removing relatively fine components of a drilled core material; and FIG. 11 is a schematic longitudinal view of another drilling machine constructed in accordance with the present invention having a hollow drill and a collection and suction removal device for drilled core material.

Figure 1:
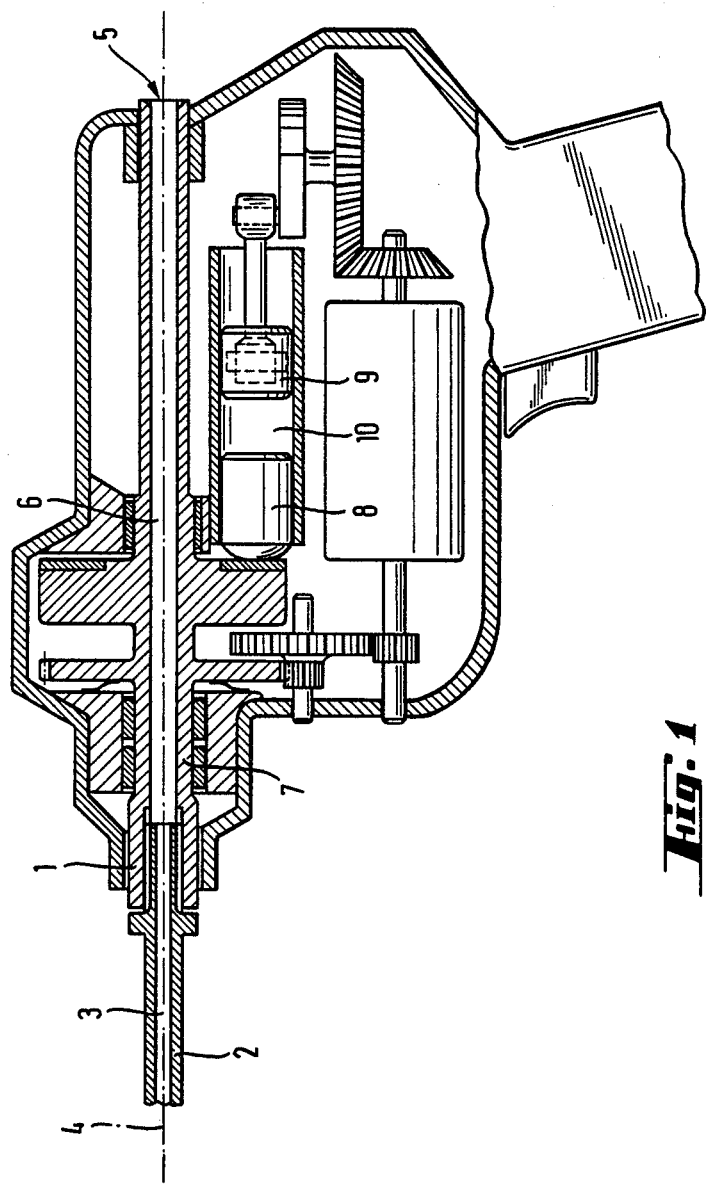
FIG. 1 is a partially schematic longitudinal cross sectional view of an electric hand drill having a drilling tool, in the form of a trepan and constructed in accordance with the present invention mounted or clamped in place.

Referring now to the drawings wherein like reference numerals are used throughout the various views to designate like parts and, more particularly, to FIG. 1, according to this figure, a drill shank 2 of a hollow drill bit is attached, in a conventional manner, in a drill bit fixture of chuck 1 of a drilling machine generally designated by the reference character D, with the drill shank 2 having a longitudinally extending recess 3 fashioned, for example, as a central hollow bore or channel, extending through an entire axial length of the drill bit and continued into the drilling machine D through a shank zone 7, configured as a drive shaft or percussion shaft, by way of a recess or bore 6. The recesses 3, 6 are concentric with the longitudinal center axis of the drilling machine D. The shank, encompassing the entire recess 3, is constituted by the drill shank 2 and shank zone 7. A drill core produced in the drilling tool is pushed, during a drilling operation, through the recess 6 in the shank zone 7 which, as noted above, is also fashioned as a hollow bore or channel and passes to the outside of a rear end of the drilling machine D and through an outlet of discharge orifice 5. At this point, the drilled core is broken up by hand or automatically by a suitable angled member (not shown) and, if necessary, collected in an attached vessel (not shown).

A striking hammer 8, oscillated, in a conventional manner, by a drive piston and air cushion 10, is disposed in parallel to the percussion shaft and at a spacing from the longitudinal axis thereof so as to minimize the structural size of the drilling machine D. Advantageously, a diameter of the recess 6 of the shak zone 7 is larger than the diameter of the recess 3 of the drill shank 2 and is adapted to enable a maximum useable drill size for the drilling machine D and/or a largest hollow channel diameter thereof. As can readily be appreciated, the principles described hereinabove can also be employed for rotary drilling machines or for rotary percussion drilling machines.

Figures 2, 2A:
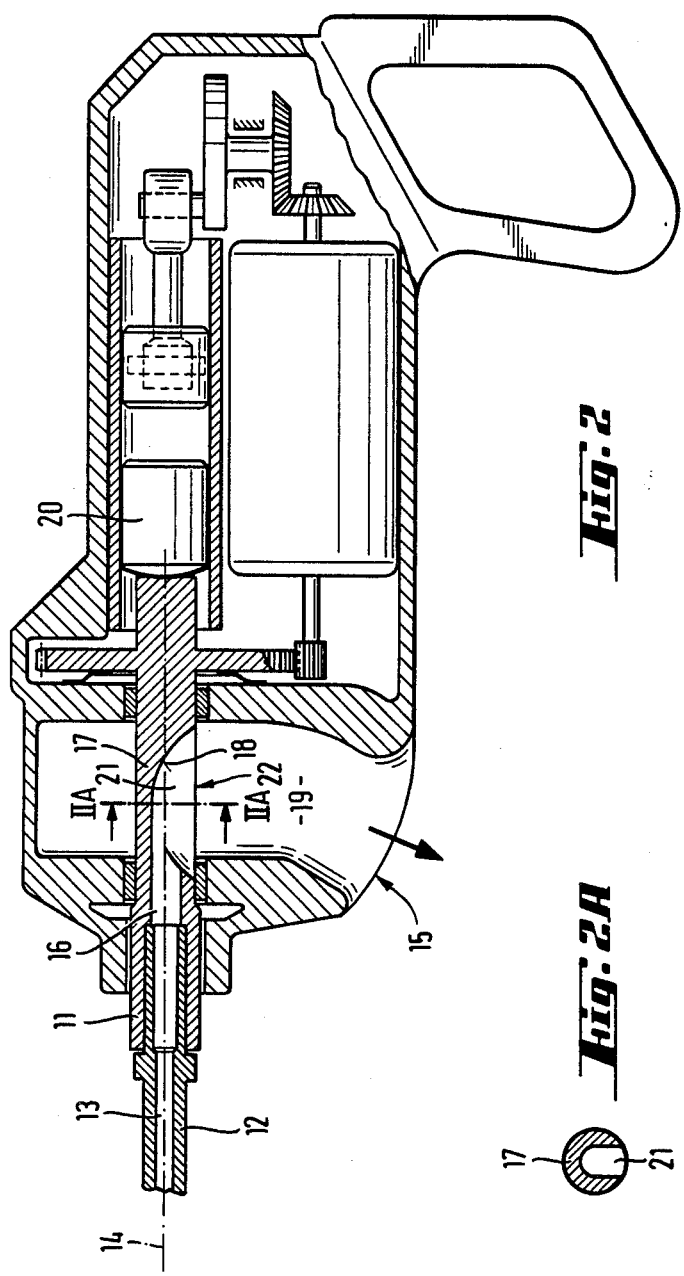
FIG. 2 is a partially schematic longitudinal cross sectional view of an electric hand drill with a trepan having lateral drilled core ejection, constructed in accordance with the present invention, clamped in place.
FIG. 2A is a cross sectional view taken along the line A-B in FIG. 2.

As shown in FIG. 2, a drilling machine generally designated by the reference character $D_1$ includes a striking 20 arranged, in a conventional manner, so as to extend along the longitudinally extending axis 14 of a trepan or boring tool 12. The boring tool 12 includes a recess 13, fashioned as a hollow bore or channel, with the tool 1 being mounted in a drill chuck 11 in a conventional manner. The tool 12 extends into a shank zone 17 of the precussion or drive shaft disposed in an interior of the drilling machine $D_1$. The recess 13, preferably in an area closely behind the drill chuck 11, extends into a further recess 16, fashioned as a hollow channel or bore, with the recess 16 having a somewhat larger diameter than a diameter of the recess 13. The recess 16 terminates in a rotating ejection duct means 21 which includes a deflection surface portion 18. The deflection surface portion 18 is advantageously dimensioned so as to be so shallow that a drilled core fed through the recesses 3, 16 is automatically broken up by the feeding action of the core during a drilling operation by the drilling machine $D_1$, with the broken core then passing through an outlet or discharge orifice generally designated by the reference numeral 22 and into a cavity or opening 19 surrounding the rotating ejection duct 21. In this manner, the drilled core material is passed from the cavity or opening 19 to the outside through an opening 15 in the housing of the drilling machine $D_1$ or is collected by a container (not shown) arranged in an area of the opening 15. In order to ensure a cost-saving manufacturing of the rotating ejection duct 21 with the outlet or discharge orifice 22, advantageously, the ejection duct 21 is fashioned so as to have a configuration, in a lateral projection, of a milled-out portion having a circular segment shape as shown, for example, in FIG. 2A.

As shown in FIG. 3, a drill shank 31 of a drilling tool may include, in a drilling zone thereof, a helix means 31 for removal of drilling dust, and, in an upper shank region 35, adjoining a drill bit mount structure 34, an ejection duct 36 provided with an outlet or discharge orifice generally designated by the reference numeral 48. The ejection duct 36 is, as shown in FIG. 3A, constructed so that a lateral deflection of a longitudinally extending recess 33 of the drill shank 31, fashioned as a central bore concentric with a longitudinal axis 32 of the drill bit, is formed by a milled-out portion underneath the drill bit chuck 34, which portion is unilateral and deepens within the drill shank. Preferably, the milled-out portion is of a circular segmental shape in a lateral view.

The recess 33 terminates at the ejection duct 36 and extends at one side out of the drill shank. During a drilling operation such as, for example, during a hammer-type drilling operation, the remaining drilled core is pushed through the recess 33 and is broken up by the lateral deflection or bending caused by the ejection ducts 36 and removed to the outside through the outlet or discharge orifice 48. Advantageously, the angle of deflection in the ejection duct 36 is suitably adapted to a thickness of the drilled core so that even drilled cores of relatively large diameter can be broken up by a shallow angling or curvature of the wall portions in the area of the ejection duct 36.

As shown in FIG. 4, at the drill tip or drill point of the drill shank, the longitudinally extending recess preferrably terminates in a step-like constriction 37 of a diameter less than a diameter of the recess 33 whereby any remaining drilled core material does not jam within the recess 33. For this purpose, it is possible to provide another widening step at another position along the longitudinal extension of the recess 33 through the drill, or the recess 33 may be gradually widened from an area of the construction in a longitudinal direction of the shank.

As shown in FIGS. 5 and 5A, the drill shank may include a tube 38 having a hollow channel or bore 46 extending in a direction of a longitudinal axis 47, with a helix means 39 being disposed on the tube 38. A helix-free shank region 42 is disposed above the helical drill zone and includes an ejection duct 44 with an outlet or discharge orifice generally designated by the reference numeral 49. The ejection duct 44 includes a laterally extending curved deflection portion 44 which is dimensioned so as to be so shallow that a relatively thick drilled core can be broken up by the advancing action of the drilled core through the hollow channel or bore 46.

As can readily be appreciated, the configuration of the drill mount arrangement 43 can be varied in dependence upon the specific constructional features of the drill bit fixture or chuck of the drilling machine.

As shown in FIG. 5B, a drill crown 40 may be provided at the drilling point or head of the drill bit with, for example, soldered-in hard metal cutters 41. However, it is also possible for the drilling head to be equipped with only two primary blades at the drill point or drill tip. In order to obtain maximially high breaking resistance for the drill shank in a zone of the ejection duct 44, a diameter of the helix or spiral free shank zone 42 below the drill mount structure 43 is dimensioned so as to be equal to or greater than a diameter of the drill point and/or of the drill head. In other respects, the drill mounting structure 43 may be configured in various ways in dependence upon the respective drill bit fixtures or chucks of the respective drilling machines.

The drilled core ejection principle of the present invention may also be utilized in metal drilling and, in such situations, it is advantageous to fashion the recess and/or diameter of the longitudinally extending hollow channel bore within the drill to be no larger than the drilling surface covered by the cross blade of the drill. In this manner, helical drills with two main cutters can be utilized for the drilling of metals, wherein the poor degree of efficiency of the cross blade is eliminated and the drilled core is removed laterally, by deflection, out of the drill shank. Also, in metal drills with more than two primary cutters or in metal crown bits, these drilling principles may also be employed.

The drilling tool in FIG. 6 includes a drill shank 51 having a recess 53 therein fashioned as a longitudinally extending central bore which begins at a point 52 of the drill bit and terminates in an angled region or bend in the zone of a suction cage 59 of a drill waste suction removal means. In order to provide ducts for intake air and exhaust or suction air, the drill shank 51 is provided with a casing 56 arranged so as to provide for a sealed free or hollow space 57 between an outer peripheral surface of the drill bit shank 51 and an inner peripheral surface of the casing 56, through which space 57 drilling dust can be withdrawn. The free or hollow space 57 is in communication with an interior of the suction cage 59 through passages 58.

As shown in FIG. 6, the diameter of the outer casing 56 is less than the diameter of the drill head 60 such that a free space is also produced between an outer peripheral surface of the casing 56 and an inner peripheral surface of a wall of the bore hole in which the drill is inserted through which feed air for the suction presses can be supplied. The recess 53 is in communication with an interior of the suction cage 59 through the lateral outlet or discharge orifice 55, with the suction cage 59 being arranged in close proximity beneath the drill mount structure 54. The suction cage 59 may be mounted so as to be rotatable with respect to the drill bit shank 51.

In the drill tool of FIG. 7, a drill shank 61 is provided with a recess 63 fashioned as a central longitudinally extending bore for enabling core drilling with lateral drilled core ejection. The recess 63 begins at a tip 62 of the drill bit and terminates shortly thereafter directly after the drill head 70 by way of the outlet orifice 65 formed at the surface of the drill shank 61. At the same time, the drill shank 61 is surrounded by a hollow casing 66 so as to define a hollow space 67, forming a suction duct, for enabling the suction removal of the drilling waste including the broken up drilled core material. The hollow space 67 is connected through passages 68 to the interior of a suction cage 69. An additional suction duct 71 establishes a communication between the suction duct 67 and the operating range of the drill at the drill point or drill head to suction off the drilling dust produced at that location as is also the case with the drill tool of FIG. 6.

Any intermediate positions may be selected for the lateral drilled core ejection between the two extreme limits illustrated in FIGS. 6 and 7 by arranging a bent or angled portion of the central longitudinally extending bore 53 or 63 at an arbitrary point of the drill bit shank between the drill mount structure 54 or 64 and the drill heads 60 or 70.

Alternatively, the casing 56 or 66 can be fashioned to extend longitudially thereby increasing the strength of the casing and also enlarging the space for the intake duct. Moreover, the diameter of the casing 56 or 66 can then be adapted to the diameter of the drill head 60 or 70.

FIG. 8 provides an example of a trepan or core drill bit having an attachable tapping device 75 mounted at the drill point or drill head of the bit. The tapping device 75 is preferably releasably fastened to the drill bit, in a conventional manner, by a catch spring. The tapping device 75 in the illustrated arrangement of FIG. 8, includes a first engaging central point 76 and primary blades 77 which engage the drilling site only after a small drilling advance and exhibit a diameter of the drill head of the drill to which the tapping device 75 is attached. By virtue of this arrangement, it is possible to place a trepan or core drill bit in a controlled fashion without the drill running out of the drilling range. After a tapping of a few millimeters, the tapping device 75 is removed from the drill and the bit can then be placed in the depression provided by the tapping device 75 without breaking away.

FIG. 9 provides another example of a trepan or core drill bit combined with a drilling waste suction removal means in a simplified form. More particularly, as shown in FIG. 9, a drill shank 81, consisting of a relatively thin-welled steel tube, is provided to which a drill head 82, a drill mount structure 83 and a specially shaped shank portion 84 are attached by, for example, soldering or welding. An outer diameter of the drill shank 81 in the illustrated embodiment is dimensioned so that a spacing 80 is formed between an outer peripheral surface of the drill shank 81 and a wall of the bore hole in which the drill is inserted thereby enabling feed air for the drilling waste removal means to be supplied through the space between the shank and wall of the bore hole. Moreover, due to an internal diameter constriction 85 of the drill head 82, a diameter of the remaining drilled core is twice as less as a radius difference 80a than an internal diameter of the drill shank 81 so that a free or hollow space is produced through which the drilling waste can be removed by suction.

In the embodiment of FIG. 9, the material of the remaining, i.e., not broken up, drilled core and drilling dust obtained at the drill tip are thus within a common hollow space of the drill shank 81 and are removed from the zone of the drill bit by the drilling waste exhaust means through a suction cage 86, exhaust duct 87, and subsequently connected hoses (not shown). At the same time, the drilled core material is ejected by the deflecting surface or bend 88 provided in the shank portion 84 out of the hollow channel of the steel tube drill shank 81. In this manner, by very simple means, a combination is provided which makes possible a core drilling, lateral drilled core ejection, and drilling waste suction removal.

In order to facilitate a suction removal of relatively large pieces of material from the residues of the drilled core out of the suction cage 86, it is advantageous to extend the exhaust duct 87 or several exhaust ducts in a downward direction of the suction cage 86.

FIG. 10 provides an example of a drilling tube which includes a drive motor and a trepan or drilling bit with a continuously extending recess 93 in the form of a longitudinally extending central bore corresponding, with respect to the type of drill core conductance approximately to the embodiment of FIG. 1. The recess 93 of the trepan shank 92 clamped into the drill chuck 91 is continued preferably in a slightly widened fashion by a recess 96 of the shank zone 97 arranged in an interior of the drilling machine and constituted, in particular, by a shaft shank of a drive shaft which rotates the bit. The recess 96 in the form of a central bore is fashioned so as to continue through to a rear side of the drilling machine and terminate with an outlet orifice 95 so that a linearly continuous path is produced for the transport of the drilled core material from the drill tip to the rear of the machine wherein the axially successive wall sections do not execute a differential motion with respect to one another.

Yet drilling waste is produced in quantity and granular size depending upon the material being drilled and which, especially in the case of a uniform diameter of the recess, impairs a smoothness of the drilled core transport. Furthermore, especially in the case of helix-free drill bit shanks, it is expedient to remove the drilling dust, produced by the drill head or bit crown, by means of suction as has been described in conjunction with the drilling tools of FIGS. 6-9 in connection with the types of drill bits discussed hereinabove.

Suction removal of the entire drilled material, especially also of the coarsley crushed drilled core, demands a correspondingly large sized and strong design of the suction removal device. For this reason, the example of FIG. 10 provides a possibility for exhausting only the drilling waste and/or drilling dust, whereas a majority of the drilled away material in the form of drilled core need not be conducted away through the exhaust means. For this purpose, a suction cage 98 and/or 98' is provided in an end zone of the drill shank 92 on the drilling machine side and/or in an interior of the drive means. The suction cage 98 and/or 98' is connected through an exhaust conduit 99 and/or 99' to an exhaust fan (not shown) and extends around the drill shank 92 and or the shank zone 97 at a point where openings 94, 94' are respectively provided in the shank casing. The openings 94, 94' may, for example, be in the form of several slots distributed about the circumference of the drill shank 92 permitting the passage of small drilling waste and/or drilling dust but being dimensioned so that coarser particles and/or coherent drilled core material will not pass through the slots. The coarse drilled material is conveyed beyond the slots and passes through the outlet orifice 95 of the recess 96 to the outside and into an appropriate container or the like whereas the small drilling waste produced by abrasion from the drilled core and/or the drilling dust produced by the drill head is sucked through the openings or slots 94, 94', respectively. In this manner, the suction removal device is under a correspondingly low load and the transportation of the drilled core through the recess 93, 96 is facilitated.

In order to intensify the suction effect in the direction toward the point of the drill bit, the outlet orifice 95 may be covered by a one way valve means 90 which permits the passing of advancing coarse drilled core material while preventing entrance of outside air into the outlet or discharged orifice 95. For this purpose, a cuff of an elastic material may be provided which encompasses the exiting drilled core with resilient contact as schematically illustrated in FIG. 10.

A suction removal limited to small drilling waste and/or drilling dust can also be provided in drilling tools having drill bits such as illustrated in FIGS. 3-6 and 9, wherein the openings 94 and the suction cage 98 surround the same, and in FIGS. 6 and 9, in place of the suction cage 59 and 86, respectively, are to be located between the drill point and the outlet orifice adjacent the latter.

FIG. 11 provides an example for accommodating drilled off material in a drilling tool constructed in accordance with the embodiment of FIG. 1; however, as can readily be appreciated, the example of FIG. 11 can be utilized in other illustrated embodiments, in part, by disposing collection vessels around the outlet or discharge orifices.

In FIG. 11, the outlet or discharge orifice 5 is encompassed by a pipe elbow 101 and a flexible length-variable hose 102 connected to the end of the pipe 101 facing away from the outlet orifice 5, with the other end of the hose 102 being connected to a fixed container 104 which may, for example, be mounted on a floor or the like. The drilled core supplied through the recesses 3 and 6 of the drill shank 2 and shank zone 7 is broken up at the pipe elbow 101 depending upon the requirement imposed by the drilled material and passes through the flexible hose 102 into the vessel 104.

In FIG. 11, the container 104 is connected through a filter 106 to an exhaust fan 105. In this situation, steps must be taken so as to prevent the hose 102 from collapsing under the vacuum produced by the exhaust fan and, for this purpose, the hose 102 may, for example, be constructed as a folded or spiraled bellows, with the collapsing of the hose being prevented by the provision of, for example, expansion rings or expansion coils 103.

In stationary drilling devices as generally used in the metal working fields wherein a drill bit can also be standing still and the tool is set correspondingly into rotation, a pipe connection which is firm in this respect is adviseable for use in place of the hose 102.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A power tool including a drive means, a housing means for accommodating said drive means, a drilling tool, and means for detachably connecting the drilling tool to the power tool, the drilling tool comprising a shank portion, a drill head means provided on said shank portion, a continuous bore means extending through said drill head means and said shank portion for receiving a discharging core material, the continuous bore means are disposed concentrically to a longitudinal center axis of the drilling tool and extend along an entire axial length of the shank portion, a further bore means is provided in a portion of said drive means and forms an extension of said continuous bore means, said further bore means includes a recess portion having a substantially circularly shaped deflection surface terminating in an outwardly directed opening in a portion of said drive means at a position shortly behind a mounting position of the drilling tool in the power tool, said outwardly directed opening being in communication with a discharge space defined by a portion of the housing means of the power tool and having a substantially radially outwardly directed outlet through which the core material from the continuous bore means and said further bore means is discharged from the power tool, and wherein said discharge space has a diameter greater than a diameter of said continuous bore means and said further bore means.

2. A power tool according to claim 1, wherein said portion of said drive means is a shaft shank of a drive shaft means of the power tool.

3. A power tool according to claim 1, wherein the power tool is a drive percussion type tool, and wherein said drive means includes means for reciprocatingly driving the drilling tool, said means for reciprocatingly driving the driling tool being disposed substantially parallel to and spaced from a longitudinal center axis of said continuous bore means.

4. A power tool according to claim 1, wherein said portion of said drive means is a percussion action shaft means of the power tool.

* * * * *